United States Patent [19]

Lyons et al.

[11] Patent Number: 5,553,504
[45] Date of Patent: Sep. 10, 1996

[54] INTRUMENTED PATCH FOR REPAIR OF FATIGUE DAMAGED OR SENSITIVE STRUCTURE

[75] Inventors: Donald R. Lyons, Melville; Stanley M. Reich, Jericho, both of N.Y.; Peter Shyprykevich, Margate, N.J.

[73] Assignee: Grumman Aerospace Corporation, Los Angeles, Calif.

[21] Appl. No.: 545,167

[22] Filed: Oct. 19, 1995

Related U.S. Application Data

[63] Continuation of Ser. No. 155,822, Nov. 23, 1993, abandoned.

[51] Int. Cl.$^6$ .................................................. G01N 19/08
[52] U.S. Cl. ................................. 73/799; 73/766
[58] Field of Search ..................... 73/775, 766, 800, 73/799, 763; 356/35.5; 52/514

[56] References Cited

U.S. PATENT DOCUMENTS

| | | | |
|---|---|---|---|
| 4,179,940 | 12/1979 | Oertle et al. | 73/799 |
| 4,806,012 | 2/1989 | Meltz et al. | 73/800 |
| 5,227,731 | 7/1993 | Prabhakaran et al. | 73/799 |
| 5,276,501 | 1/1994 | McClintock et al. | 356/352 |

*Primary Examiner*—Richard Chilcot
*Assistant Examiner*—Harshad Patel
*Attorney, Agent, or Firm*—Terry J. Anderson; Karl J. Hoch, Jr.

[57] ABSTRACT

An apparatus for preventing, detecting, and predicting the formation and propagation of cracks in structural members. The apparatus includes a plurality of strain sensors integrally formed with a patch to be fixed to an area on the surface of a structural member. The patch operates to reduce stress levels in the patch-covered area for deterring the formation or propagation of a crack therein. The sensors monitor changes in the strain field in the patch-covered area for detecting crack formation and detection. The apparatus may also include a temperature-compensating strain sensor and a temperature sensor both integrally formed with the patch for detecting and predicting crack formation and propagation, respectively.

15 Claims, 5 Drawing Sheets

INTRUMENTED PATCH FOR REPAIR OF FATIGUE DAMAGED OR SENSITIVE STRUCTURE

This application is a continuation of application Ser. No. 08/155,822, filed Jan. 23,1993 now abandoned.

FIELD OF THE INVENTION

The present invention generally relates to monitoring defects in structural members and, more particularly, to an apparatus for preventing, detecting, and predicting the formation and propagation of cracks in structural members which are subject to stress.

BACKGROUND OF THE INVENTION

Load-bearing structural members, such as metal aircraft skin, frame, and support members, have a tendency to crack at stress riser areas. Once formed, these cracks tend to propagate causing further damage. The end result could be failure of the members with consequent loss of equipment and productivity, and possibly even loss of life. In view of these serious considerations, very costly repair measures must be implemented to preserve the structural integrity of those members.

Several curative measures, if taken, would prove to be most advantageous in overcoming the problems associated with stress cracking in structural members: 1) to predict the formation of new cracks and the propagation of existing cracks at critical areas on the surface of a structural member; 2) to implement preventative measures to deter the formation and propagation of cracks in these areas; and 3) to detect the formation and propagation of cracks should the preventative measures fail.

Some of these curative measures have been implemented in the prior art. For example, a variety of approaches have been developed to retard crack growth in structural members. One approach, as disclosed in U.S. Pat. No. 5,023,987, involves using a repair patch to repair damaged areas on composite skin structures such as aircraft wings. The patch is unitary in form and is fabricated from the same composite material used to construct the aircraft wing. Once fixed to the aircraft wing, the patch reduces stress levels in the damaged area to retard further structural damage. Similarly, U.S. Pat. No. 5,034,254 discloses a patch for repairing damaged areas on load-bearing, composite panels. This patch conforms to the curvature of the panel on which it is to be fixed and restores the panel to nearly its original load-carrying capability.

One drawback associated with the use of repair patches is the cost and inconvenience associated with having to remove and then remount the patch when performing a visual inspection for crack formation and propagation.

U.S. Pat. No. 4,179,940 discloses a technique for predicting crack formation in patch-covered areas on a structural member without removing the patch. Under this technique, crack initiation prediction is determined as a function of strain measurements taken in a patch-covered area on the surface of a metal aircraft frame member as that member is stressed towards fatigue failure. The patch used to implement this technique contains two strain gauges which are in fluid communication with one another beneath a sealed, pressurized cavity. Unlike the repair patches discussed above, however, this patch is constructed from a material which has no load-bearing properties and thus is unable to reduce stress levels in damaged areas on the surface of a structural member to deter crack formation or propagation.

At best, the prior art offers only a partial solution to the problems associated with stress cracking in structural members. Some prior art references address the crack detection problem while others address the crack prevention problem. None, however, offer all of the curative measures discussed above. Accordingly, a need exists for a method and apparatus which provides a complete solution to the problems presented by stress cracking in structural members which is achieved by implementing a three-pronged approach —the prevention, detection, and prediction of the formation and propagation of stress cracks in structural members.

SUMMARY OF THE INVENTION

Accordingly, it is a principal objective of the present invention to provide an apparatus for preventing, detecting, and predicting the formation and propagation of stress cracks in patch-covered areas on the surface of a structural member.

It is another objective of the present invention to provide an apparatus for detecting the formation and propagation of cracks in a structural member with enhanced sensitivity achieved through the implementation of temperature compensating measures.

It is another objective of the present invention to provide an apparatus for preventing, detecting, and predicting the formation and propagation of cracks in structural members made from a wide variety of materials.

It is another objective of the present invention to provide an apparatus for preventing, detecting, and predicting the formation and propagation of cracks in a structural member which has a versatile design that can accommodate a variety of sensor arrangements, sensitivities and types for meeting application-specific requirements.

It is another objective of the present invention to provide an apparatus for accomplishing in situ and off-line detection of the formation and propagation of cracks in a structural member.

It is another objective of the present invention to provide an apparatus for predicting and detecting the propagation of cracks on the surface of a structural member having a sensor configuration tailored to match the specific characteristics of each crack to thus eliminate the need for performing excessive field work.

The foregoing and other objectives of the invention are achieved by providing an apparatus for preventing, detecting, and predicting the formation and propagation of cracks in structural members. The apparatus includes a plurality of strain sensors integrally formed with a patch to be fixed to an area on the surface of a structural member where a crack may be expected to form or where a crack already exists. The load-bearing properties of the patch enable it to reduce stress levels in the patch-covered area for deterring the formation or propagation of a crack therein. The strain sensors monitor the strain field in the patch-covered area. The formation or propagation of a crack in the patch-covered area causes a stress redistribution which can be detected by the strain sensors as a corresponding change in the strain field. The strain sensors output a signal indicative of this stress change which is processed for detecting crack formation in the patch-covered area.

The apparatus may also include a temperature-compensating strain sensor integrally formed with the patch which measures an external strain field in the patch-covered area for deriving a signal indicative of the temperature-induced stress. This temperature-dependent signal is then compared with the signal provided by the strain sensors to generate a signal indicative of the strain existing in the patch-covered area which is free from strain contributions due to temperature-induced stress. This temperature-compensated signal is then processed to detect crack propagation and detection in the patch-covered area.

The apparatus may also be equipped with a temperature sensor integrally formed with the patch for generating a signal indicative of the surface temperature of the member, which is then used to predict crack formation and propagation in the patch-covered area at extreme temperatures.

These and other objectives, features and advantages of the invention are disclosed in or apparent from the following description of preferred embodiments.

BRIEF DESCRIPTION OF THE DRAWINGS

The preferred embodiments are described with reference to the drawings in which.

DESCRIPTION OF THE PREFERRED EMBODIMENTS

Figure 1:
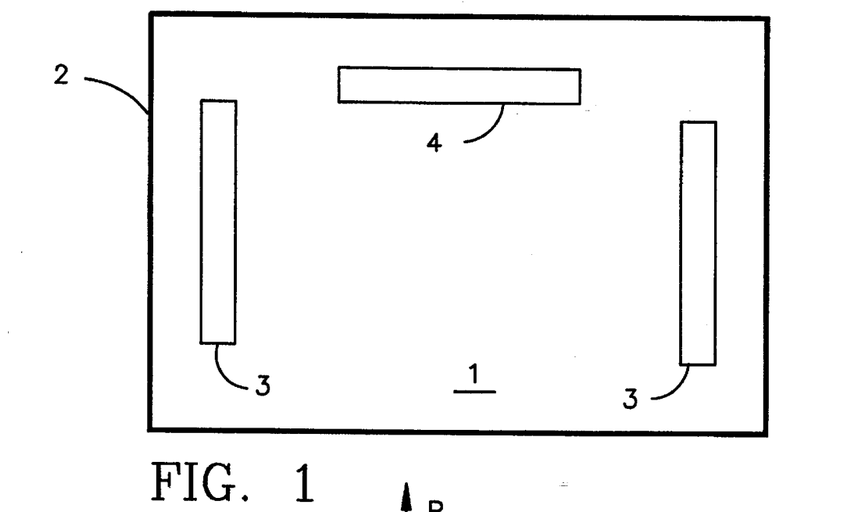
FIG. 1 is a diagram showing the most basic form of the apparatus of the present invention.

Referring to FIG. 1, the most basic form of the invention contemplates a patch-sensor assembly 1 which includes a pair of strain sensors 3, a temperature-compensating strain sensor 4, and a repair patch 2. Repair patch 2 is a structural member which is made of a strong, resilient material having load-bearing properties. If desired, patch 2 may be made of the same material from which the structural member is made so it advantageously may demonstrate the same load-bearing properties as the structural member. In addition, patch 2 may be pliable so as to conform with the topology of any surface to which it is attached.

Strain sensor pair 3 and temperature-compensating strain sensor 4 are substantially flat in geometry and may be selected from a wide variety of sensor arrangements with varying sensor sensitivities. For example, sensors 3 and 4 may be of the resistive wire foil, fiber optic or semiconductor type. Although three strain sensors are depicted in FIG. 1, the specific number and types of sensor arrangements used and the manner in which those sensors are integrated onto the patch are selected to be commensurate with the nature and purpose of the intended application of the patch-sensor assembly and the desired level of sensor sensitivity required to perform that application.

The patch-sensor assembly may be constructed in a variety of ways. Sensors 3 and 4 may be formed integrally with patch 2 by being either embedded within the body of the patch or bonded flush to one of its surfaces. Sensors 3 and 4 also may be attached directly onto the surface of a member to be monitored. In this case, patch 2 would be placed over sensors 3 and 4 and secured to the surface of the member.

The patch-sensor assembly of the present invention prevents, detects, and predicts the formation and propagation of cracks in structural members, including metallic structural members, such as frame and support members used in aircraft, ships, pressurized vessels, and beams used in the construction of bridges and buildings, as well as non-metallic structural members, such as those constructed from wood, plastic or composite materials. Patch-sensor assembly 1 most advantageously performs the above-described functions in areas on a structural member which are obstructed from view and therefore which are not easily inspected. Such areas include those containing weld lines, inaccessible areas on frame support members used, for example, in the construction of bridges, ships or aircraft, and portions of members being eclipsed by other structures such as the ribs of a ship hull and beams in a building.

More specifically, patch-sensor assembly 1 performs at least the following essential functions: 1) preventing the formation of new cracks and the propagation of existing cracks in patch-covered areas on the surface of a structural member; 2) detecting the formation of new cracks and propagation of existing cracks in those areas should the patch fail to prevent such damage; and 3) predicting crack formation and propagation in those areas.

Crack formation and propagation prevention is achieved by fixing patch-sensor assembly 1 to a fatigue sensitive area on the surface of a structural member where a crack is very likely to form or where an existing crack already exists. Once in place, the load-bearing properties of repair patch 2 enable it to reduce stress levels in the patch-covered area by assuming a portion of the load that the patch-covered area would otherwise experience. This stress reduction lessens the likelihood that a crack will form or an existing crack will propagate in that area.

Crack formation and propagation detection likewise is achieved by fixing patch-sensor assembly 1 to a fatigue sensitive area on the surface of a structural member or to an area where a crack already exists. Once in place, strain sensor pair 3 monitors the strain field in the region in and surrounding the patch-covered area. The formation or propagation of a crack, or both, in this area results in a redistribution of stress in the region under discussion which can be measured by strain sensor pair 3 as a corresponding change in the strain field. Signals proportional to the measured change in the strain field are processed to provide an indication that a crack has formed or propagated in the patch-covered area.

Figure 2:
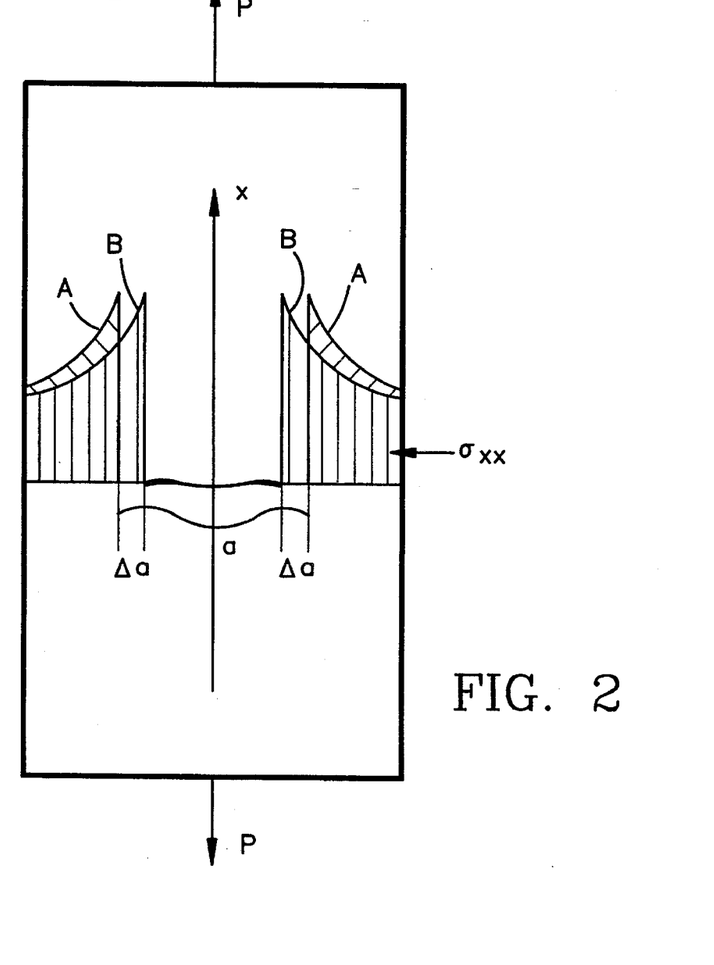
FIG. 2 is a graph showing the redistribution of stress that occurs around a crack on the surface of a structural member that results from crack propagation.

FIG. 2 is a graph showing, for illustrative purposes, the stress redistribution that occurs around a crack when a member is subject to a unidirectional tensile load P. Curve A represents the stress distribution $\sigma_{xx}$ around the crack before it propagates, and Curve B represents the stress distribution $\sigma_{xx}$ around the crack after propagation has occurred. The quantity $\Delta a$ represents the change in the stress distribution around the crack that occurs as a result of crack propagation.

In addition to crack formation and propagation detection, measuring the strain field in the region in and surrounding the patch-covered area permits patch-sensor assembly 1 to detect anomalies in the structural integrity of the patch itself. Such anomalies include tears and holes forming in the patch, instances where the patch becomes wholly or partially detached from the surface of the structural member, or any other defect in the repair patch which may cause it to no longer provide the force required to reduce stress levels in the patch-covered area for deterring crack formation and propagation. Anomalies in the structural integrity of the patch also produce a strain field redistribution in the region under discussion which can be detected by strain sensor pair 3.

Figure 3:
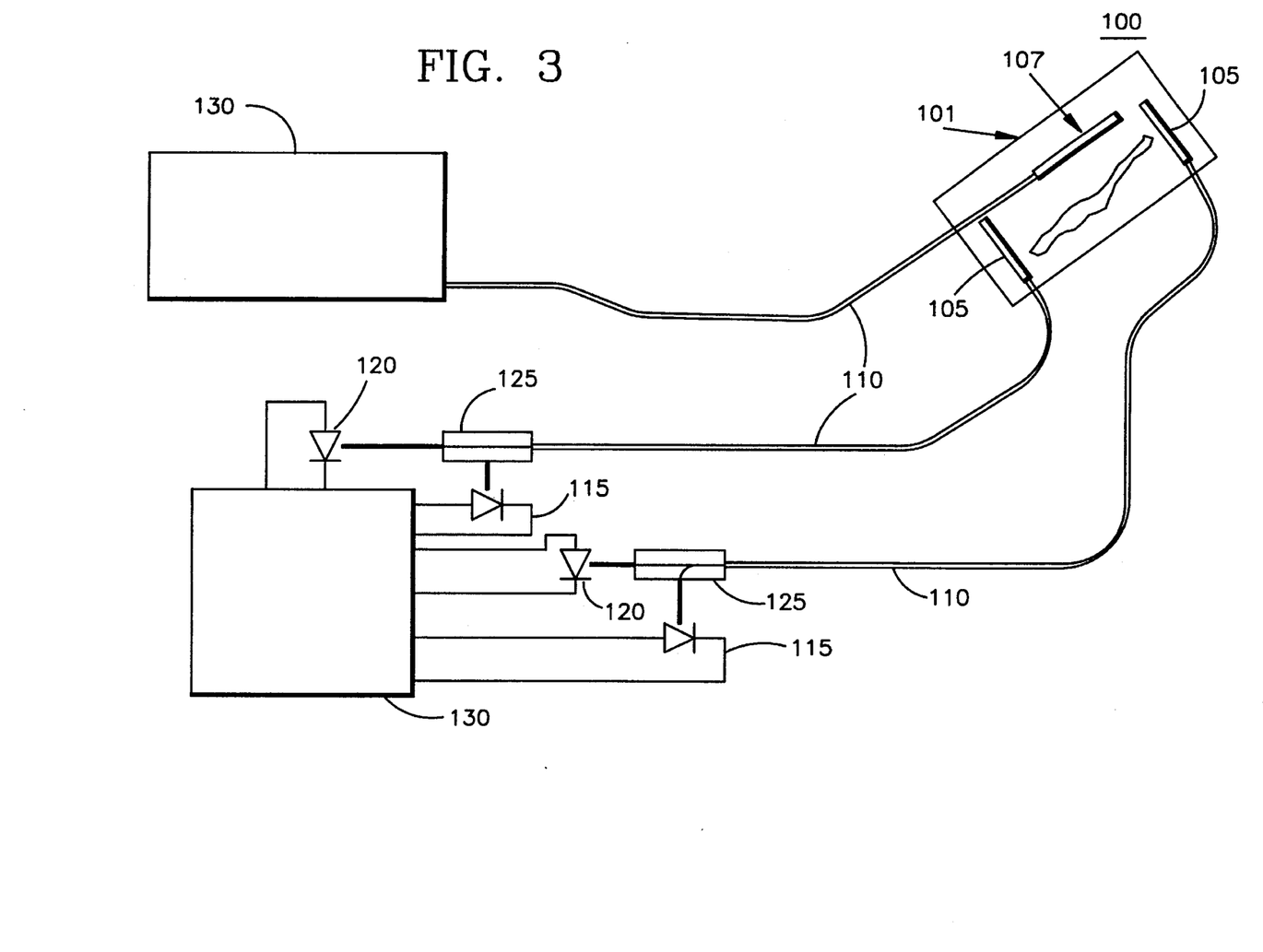
FIG. 3 is a diagram showing a most preferred embodiment of the apparatus of the present invention incorporating Bragg reflection strain sensors.

Referring to FIG. 3, a most preferred embodiment of the present invention contemplates a patch-sensor assembly 100 including a repair patch 101, two Bragg reflection strain sensors 105, a temperature-compensating Bragg reflection strain sensor 107, optical fiber transmission lines 110, a transmitter 115, a receiver 120, a beam splitter 125, and a processor 130. As previously discussed, any variety of strain sensors may incorporated into the patch-sensor assembly. Bragg reflection strain sensors are used in the present embodiment for their enhanced sensitivity characteristics.

Figure 4:
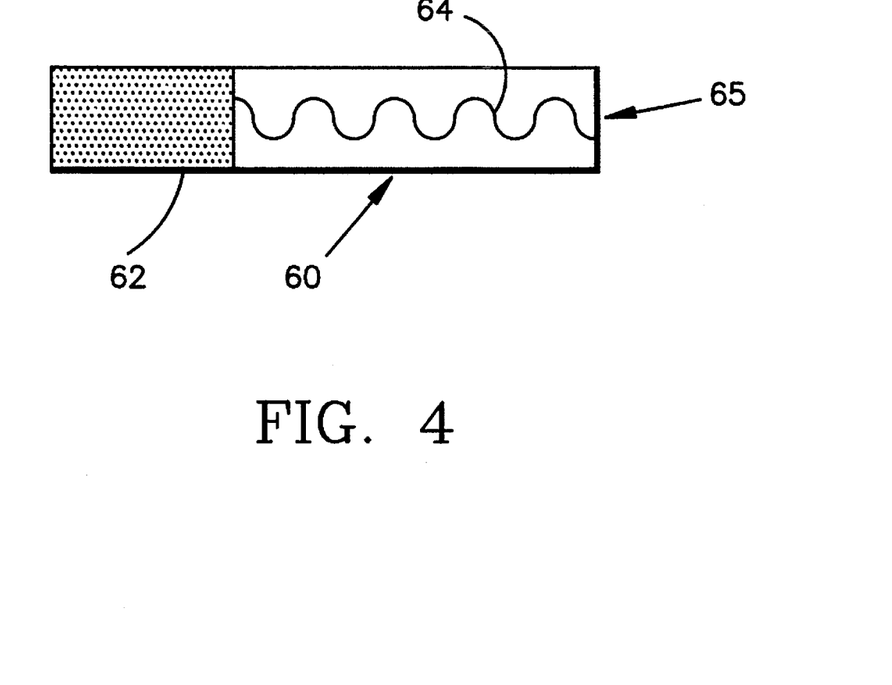
FIG. 4 is a detailed diagram showing the specific configuration of a Bragg reflection strain sensor used in connection with the present invention.

A preferred Bragg sensor is arranged as follows: As depicted in FIG. 4, a Bragg reflection strain sensor 60 is attached to the end of an optical fiber transmission line 62 by using an optical grade epoxy or a fusion splice. Radiation transmitted to the Bragg sensor is reflected by a reflector 65 which, in turn, generates a Bragg grating 64. Changes in the Bragg grating resulting from strain changes on the surface of a structural member can be detected to determine crack formation and propagation, as will be explained in greater detail below. The overall operation of suitable Bragg reflection strain sensors used to monitor strain on the surface of a structural member is disclosed in pending U.S. patent application Ser. No. 713,503.

Transmission lines 110 are selected to be compatible with the type of strain sensor integrated into the patch. Accordingly, in the present embodiment, transmission lines 110 may be single-mode optical fibers which propagate laser light between beam splitter 125 and Bragg reflection strain sensors 105 and 107. Beam splitter 125 discriminates between light transmitted by transmitter 115 and received by the Bragg reflection strain sensors through transmission lines 110. Transmitter 115 preferably is a diode laser transmitting laser light at a single pre-determined wavelength, and receiver 120 preferably is a photodiode.

The orientation of patch-sensor assembly 100 with respect to the surface of a structural member is determined based on the purpose for which assembly 100 is being used. When used for crack formation detection, assembly 100 must be fixed to the surface of a structural member so that strain sensors 105 are disposed in an area subject to high fatigue stress where a crack may be expected to form. Patch-sensor assembly 100 may be adapted to include a plurality of pairs of strain sensors 105 for monitoring various fatigues sensitive regions under repair patch 101.

Figure 5:
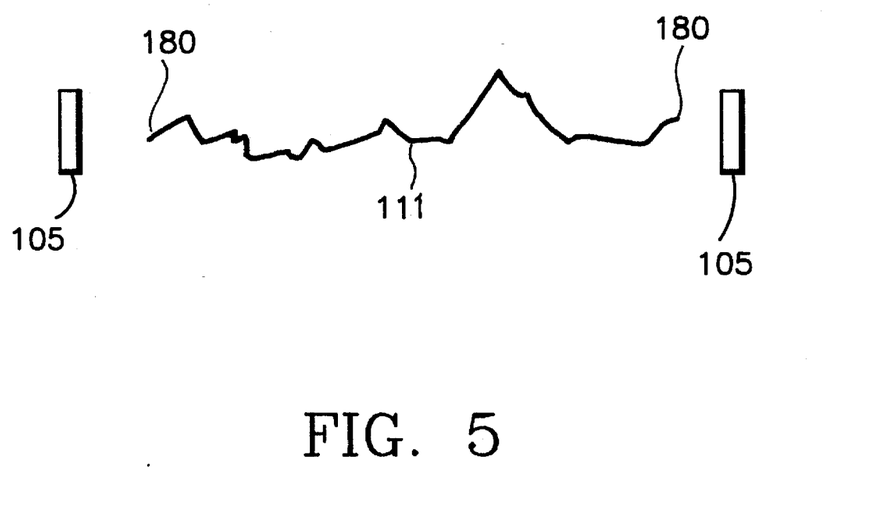
FIG. 5 is a diagram showing the orientation of the strain sensors used in the apparatus of the present invention for achieving crack propagation detection.

When used for crack propagation detection, assembly 100 must be fixed to the surface of a structural member so that each strain sensor 105 is disposed just beyond an end 180 of an existing crack 111 on the surface of a structural member, as depicted in FIG. 5. In this case the patch-sensor assembly may be modified to include a number of strain sensors equal to the number of ends possessed by a crack to be monitored. In the specific embodiment depicted in FIG. 5, the patch-sensor assembly contains two strain sensors for monitoring the propagation of a crack having two ends.

Patch-sensor assembly 100 may be used to detect simultaneously the formation of new cracks and the propagation of existing cracks in the region being covered by the patch. In such case, pairs of strain sensors 105 must be oriented on the patch in the above-described manner.

Regardless of whether the patch-sensor assembly is used for crack formation or propagation detection, temperature-compensating strain sensor 107 must be situated on the patch so that it lies outside of the external strain field, e.g., a zero-strain region or an area which is free from strain attributable to external mechanical loading. In this way, temperature-compensating strain sensor 107 functions to monitor only temperature-induced strain changes on the surface of a structural member.

In operation, the Bragg reflection strain sensors continuously monitor the strain field in the region underlying and immediately surrounding patch-sensor assembly 100. The formation of a new crack, the propagation of an existing crack, or an anomaly in the structural integrity of the patch produces a redistribution of stress in this region. In the specific case of crack propagation, as depicted in FIG. 4, the propagation of an end of an existing crack towards a strain sensor 105 produces a stress redistribution in the form of a stress reduction in the immediate area occupied by the crack and a stress enhancement in the immediate area underneath the sensor. This stress redistribution produces a change in the strain field in the same region which is detected by strain sensors 105 as a corresponding change in the resonant frequency of the Bragg grating. Changes in the resonant frequency of the Bragg grating cause the intensity of the single wavelength laser light transmitted to sensors 105 to be modulated. The laser light has a finite bandwidth of the type that would be produced, for example, by a broadband super luminescent diode. An optical signal proportional to this intensity modulation is reflected down a separate transmission line to beam splitter 125 where it is diverted to photodiode receiver 120 and converted into an electrical signal. Processor 130 then processes the electrical signal to derive a strain signal for determining whether a crack has formed or propagated in the patch-covered area, or whether some anomaly has occur red to the structural integrity of the patch.

Simultaneously, temperature-compensating strain sensor 107 measures temperature-induced :strain in an area on the surface of the structural member which lies outside the external strain field. Sensor transmits an optical signal proportional to the strain in this area through a transmission line to a temperature-compensating processor, which processes this signal to provide a strain signal indicative of temperature-induced stress in the patch-covered areas. This temperature-induced strain signal is then subtracted from the signal derived from strain sensor pair 105 to generate a strain signal independent of temperature-induced stress which is indicative of the stress levels existing in the patch-covered area. The temperature-independent strain signal is then processed to determine whether a crack has formed or propagated in the patch-covered area, thereby distinguishing changes in the strain field caused by crack formation or propagation from changes in the strain field resulting from temperature-induced expansion or contraction in an otherwise undamaged member.

The temperature-compensating processor may be a part of processor 130 or a separate processor which communicates with processor 130 for processing the above-described signals.

Patch-sensor assembly 100 may be adapted to include a plurality of pairs of strain sensors for detecting crack formation in a plurality of areas under the patch or the propagation of a plurality of cracks in that patch-covered area. In addition, a plurality of patch-sensor assemblies may be distributed over a variety of regions on the surface of a structural member and then multiplexed on a single optical fiber transmission line for input into a processor. Multiplexing patch-sensor assemblies provides the advantage of reducing the number of access leads to each sensor.

Figure 6:
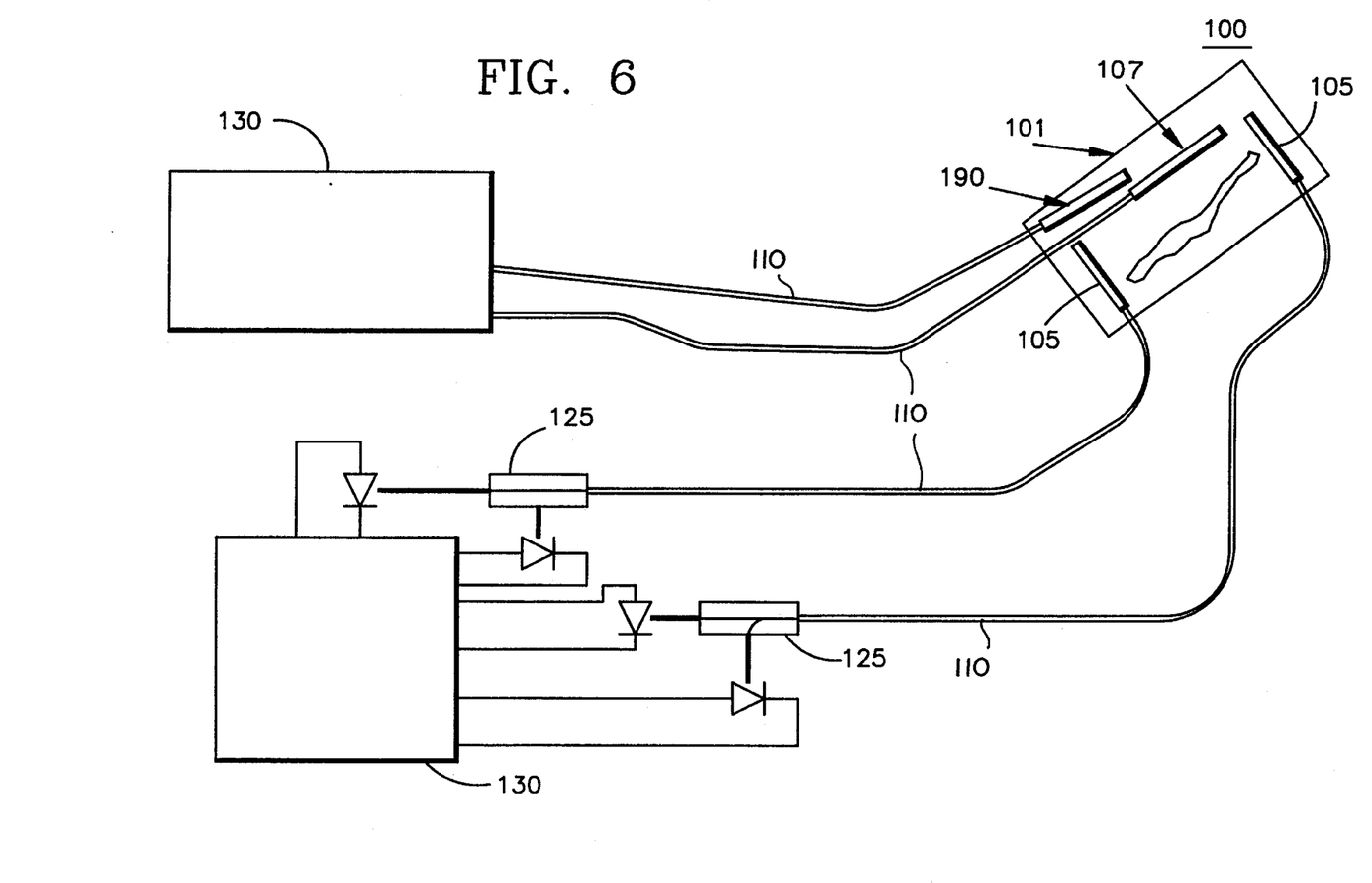
FIG. 6 is a diagram showing a specific embodiment of the apparatus of the present invention which contains a temperature sensor for predicting crack formation and propagation.

Extreme temperature conditions may cause cracks to form or propagate in structural members subject to high stress whose strength characteristics materially change with temperature. Patch-sensor assembly 100 may be modified to include a temperature sensor 190 for predicting crack formation and propagation at extreme temperatures in members demonstrating such characteristics. As shown in FIG. 6, temperature sensor 190 may be integrated onto the patch in a manner identical to that used to integrate strain sensors 105 and 107 onto the patch. In operation, sensor 190 provides a signal proportional to the temperature of the surface of the structural member. This temperature signal, when viewed in light of existing stress conditions derived from the strain measurements taken by sensors 105 and 107, can be used to predict whether a crack is likely to form or propagate in the patch-covered area as a result of the extreme temperature conditions. If desired, sensor 190 may be multiplexed onto the transmission lines connecting strain sensors 105 and 107.

Figure 7:
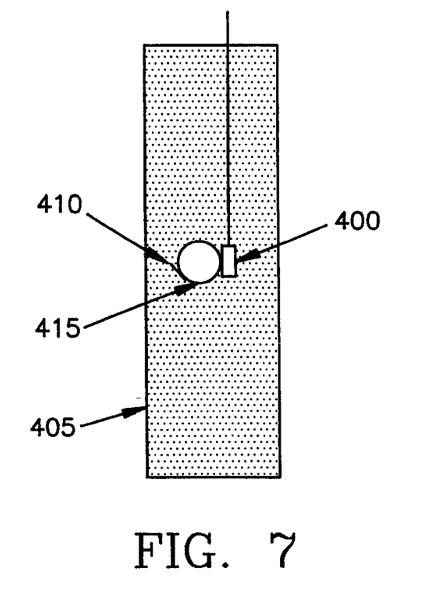
FIG. 7 is a diagram showing a preferred embodiment of the apparatus of the present invention incorporating an extrinsic Fabry-Perot interferometer sensor.

In another preferred embodiment of the present invention, patch-sensor assembly 100 includes a repair patch employing an extrinsic Fabry-Perot interferometer (EFPI) strain sensor. Like Bragg reflection strain sensors, the EFPI sensor has increased sensor sensitivity for detecting strain changes and thus can outperform traditional strain sensors, such as resistive foil strain gauges, in the detection of crack formation and propagation in structural members. And, as with other embodiments, the EFPI sensor may be either attached directly to the surface of a member to be monitored or formed integrally with a repair patch.

Figure 8:
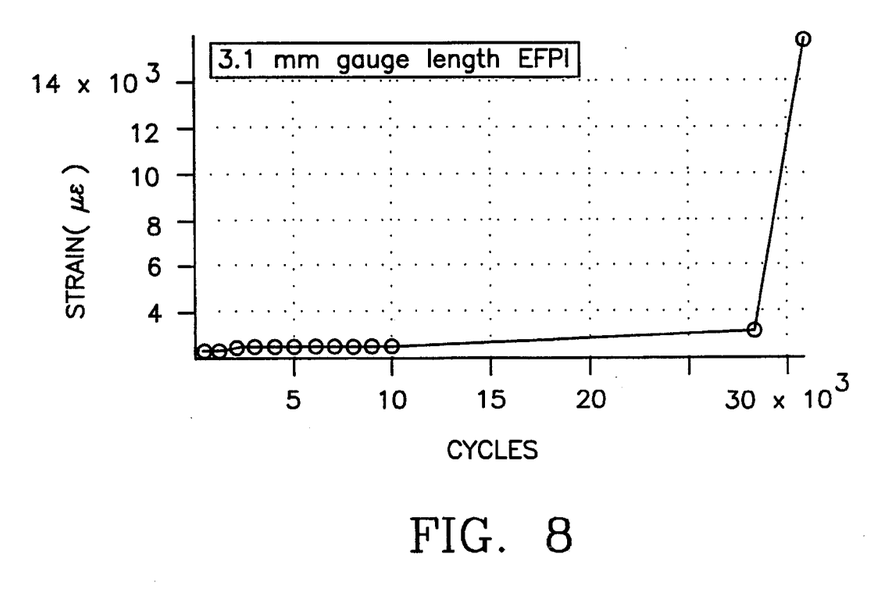
FIG. 8 is a graph showing the strain experienced by the Fabry-Perot interferometer sensor incorporated in the apparatus of FIG. 7 as a function of cyclic loading.

A patch-sensor assembly using an EFPI sensor, or a Bragg reflection strain sensor, provides at least one other advantage—the detection of non-local crack formation and propagation. A patch-sensor assembly which uses an EFPI sensor need not be placed in the vicinity of the crack end in order to detect crack propagation. Rather, the EFPI sensor can detect the redistribution of strain forces in the structural member with sufficient sensitivity to achieve reliable crack propagation detection even if it is placed in an area remote from a crack. FIGS. 7 and 8 further illustrate this point.

FIG. 7. shows an EFPI sensor 400 having a 3.1 mm gauge length mounted on one side of a hole 415 in an aluminum structural member 405. A non-local crack 410 whose propagation is to be monitored is located on the other side of the hole. The patch is omitted in this diagram. FIG. 8 is a graph showing a plot of the strain experienced by the EFPI sensor as member 405 is subjected to increased cyclic loading. Stress applied to the aluminum member by the cyclic loading causes crack 410 to propagate in a direction away from sensor 400. The curve plotted on that graph shows that, as the strain increases in the member, crack propagation becomes detectable by the EFPI sensor well before 29,000 cycles, the point at which the crack propagation can be first visually observed. And, most significantly, crack propagation detection is achieved without the crack ever having once propagated through the gauge length of the EFPI sensor.

Other modifications and variations to the invention will be apparent to those skilled in the art from the foregoing disclosure and teachings. Thus, while only certain embodiments of the invention have been specifically described herein, is will be apparent that numerous modifications may be made thereto without departing from the spirit and scope of the invention.

What is claimed is:

1. An apparatus for preventing and detecting formation or propagation of a crack in a structural member, said apparatus comprising:

a patch, adapted to be fixed to a surface of a structural member, which forms a means for reducing stress levels in a patch-covered area on the surface of the member by bearing a substantial portion of a load on said surface; and strain-sensing means integrally formed with said patch for sensing a strain field in a fatigue sensitive region within the patch-covered area, said strain-sensing means providing a signal indicative of changes in the strain field in said fatigue sensitive region.

2. The apparatus of claim 1, further comprising:

temperature-compensating strain-sensing means integrally formed with said patch for providing an external strain field signal indicative of the strain field in an area which lies outside of said fatigue sensitive area within the patch-covered area.

3. The apparatus of claim 2, further comprising:

first processing means for processing the signal from said strain-sensing means to provide a first strain signal indicative of a stress distribution in said fatigue sensitive region;

first transmitting means for transmitting the strain signals from said strain-sensing means to said processing means;

second processing means for processing the external strain field signal to provide a second strain signal indicative of temperature-induced stress in said area which lies outside of said fatigue sensitive area within the patch-covered area; and second transmitting means for transmitting the signal from said temperature-compensating strain-sensing means to said second processing means; and comparison means for comparing said first and said second strain signals to obtain a temperature-independent strain signal indicative of a contribution to the strain field in the fatigue-sensitive region caused by the formation or propagation of a crack in said region.

4. The apparatus of claim 2, wherein said strain-sensing means and said temperature-compensating strain-sensing means are constructed from one of the group of strain-sensing devices consisting of wire foil strain-sensing devices, semiconductor strain-sensing devices, or optical fiber strain-sensing devices.

5. The apparatus of claim 2, wherein said strain-sensing means and said temperature-compensating strain-sensing means are Bragg reflection strain sensors.

6. The apparatus of claim 2, wherein said strain-sensing means is an extrinsic Fabry-Perot interferometer sensor and wherein said fatigue sensitive region is a location remote from an area where a crack has formed or is expected to form.

7. The apparatus of claim 2, wherein said strain-sensing means is a Bragg reflection strain sensor and wherein said fatigue sensitive region is a location remote from an area where a crack has formed or is expected to form.

8. The apparatus of claim 2, wherein said temperature-compensating strain-sensing means is an extrinsic Fabry-Perot interferometer sensor.

9. The apparatus of claim 1, further comprising extreme temperature-sensing means formed integrally with said patch for providing a signal proportional to the temperature of said structural element in said patch-covered area in order to predict possible formation or propagation of a crack in said fatigue sensitive area resulting from extreme temperature conditions.

10. The apparatus of claim 1, wherein said structural member is constructed from the group of materials consisting of metal, wood, plastic, concrete or a composite structural material.

11. The apparatus of claim 1, wherein said patch and structural member are made from like material.

12. The apparatus of claim 1, wherein said strain sensing means comprises at least two strain sensors dispose beyond respective ends of an existing crack for detecting propagation of the crack.

13. A method for detecting formation or propagation of a crack in a structural member, comprising the steps of:

fixing a repair patch to a surface of a structural member such that said repair patch covers an area on said surface containing at least a portion of a crack and reduces a level of stress in said area by bearing a portion of a load on said surface;

sensing changes in the strain field in said area and deriving therefrom a first strain signal indicative of the stress distribution in said patch-covered area;

sensing the strain field in an area under the patch lying outside of the area occupied by the crack and deriving therefrom a second strain signal indicative of temperature-induced stress in an area within said patch-covered area which lies outside of the area occupied by the crack; and comparing said first and said second strain signals to determine an amount of said first strain signal which results from formation or propagation of the crack in said patch-covered area.

14. The method of claim 13, further comprising the steps of:

sensing the temperature of the member in the patch-covered region and providing a signal proportional thereto; and processing said temperature signal to predict temperature-induced formation or propagation of a crack in said patch-covered area.

15. The method of claim 13, wherein the step of fixing the repair patch to the surface comprises the step of fixing the repair patch over two ends of the crack such that strain sensors integral with the patch are positioned beyond respective said ends of the crack.

* * * * *